United States Patent
Amtmann (10) Patent No.: US 8,253,540 B2
(45) Date of Patent: Aug. 28, 2012

(54) METHOD OF READING DATA FROM TRANSPONDERS THROUGH A READER, A TRANSPONDER, AND A READER

(75) Inventor: Franz Amtmann, Graz (AT)

(73) Assignee: NXP B.V., Eindhoven (NL)

( * ) Notice: Subject to any disclaimer, the term of this patent is extended or adjusted under 35 U.S.C. 154(b) by 926 days.

(21) Appl. No.: 12/090,985

(22) PCT Filed: Oct. 24, 2006

(86) PCT No.: PCT/IB2006/053897
§ 371 (c)(1),
(2), (4) Date: Apr. 21, 2008

(87) PCT Pub. No.: WO2007/049219
PCT Pub. Date: May 3, 2007

(65) Prior Publication Data
US 2008/0272891 A1    Nov. 6, 2008

(30) Foreign Application Priority Data
Oct. 25, 2005  (EP) ..................... 05109961

(51) Int. Cl.
*H04Q 5/22* (2006.01)
*H04W 4/00* (2009.01)
*H04B 7/212* (2006.01)
*H04L 12/403* (2006.01)
(52) U.S. Cl. ....... 340/10.3; 370/328; 370/337; 370/458; 340/10.2
(58) Field of Classification Search .................. None
See application file for complete search history.

(56) References Cited

U.S. PATENT DOCUMENTS
5,640,151 A * 6/1997 Reis et al. .................. 340/10.2
(Continued)

FOREIGN PATENT DOCUMENTS
| | | |
|---|---|---|
| EP | 0957442 A1 | 11/1999 |
| EP | 1313057 A2 | 5/2003 |
| FR | 2760280 A1 | 9/1998 |
| GB | 2259227 A * | 3/1993 |

OTHER PUBLICATIONS

EPC Global "Specification for RFID Air Interface" EPC Radio-Frequency Identity Protocols, Class-1 Generation-2 UHF RFID, Protocols for Communications at 860 MHZ-960 MHZ, Version 1.0.9, Jan. 2005.

(Continued)

*Primary Examiner* — George Bugg
*Assistant Examiner* — Renee Dorsey (57) ABSTRACT

A method of reading data (DAT1 . . . DAT4) from transponders (T1 . . . T4) by means of a reader device (RD) during a number (N) of time slots (TS) is disclosed, wherein the seizure of said time slots (TS) by the transponders (T1 . . . T4) is observed in both the reader device (RD) and the transponders (T1 . . . T4). A reorganization (REORG) is performed in dependence on said seizure, wherein both the reader device (RD) and the transponders (T1 . . . T4) choose a new number (N) of time slots (TS). In addition, the transponders (T1 . . . T4) select one of the new time slots (TS) in which to send data (DAT1 . . . DAT4) back to the reader device (RD) so as to adapt the system's capacity to the real demands. Preferably, said reorganization (REORG) takes place without communication between the reader device (RD) and the transponders (T1 . . . T4). The invention further relates to a transponder (T1 . . . T4) and to a reader device (RD) for implementing the inventive method.

16 Claims, 3 Drawing Sheets

U.S. PATENT DOCUMENTS

| | | | | |
|---|---|---|---|---|
| 6,061,344 | A * | 5/2000 | Wood, Jr. | 370/346 |
| 6,377,203 | B1 * | 4/2002 | Doany | 342/44 |
| 6,784,787 | B1 * | 8/2004 | Atkins et al. | 340/10.4 |
| 7,009,495 | B2 * | 3/2006 | Hughes et al. | 340/10.2 |
| 7,511,604 | B2 * | 3/2009 | Raphaeli et al. | 340/10.2 |
| 8,036,329 | B2 * | 10/2011 | Spindler et al. | 375/354 |
| 2002/0063622 | A1 * | 5/2002 | Armstrong et al. | 340/10.31 |
| 2003/0179078 | A1 * | 9/2003 | Chen et al. | 340/10.2 |
| 2007/0164850 | A1 * | 7/2007 | Spindler et al. | 340/10.2 |

OTHER PUBLICATIONS

EPC Global Inc. "Specification for RFID Air Interface—EPC Global" Version 1.0.9, 2004.

Auto-ID Center "Technical Report—13.56 MHZ ISM Band Class 1 RFID Interface Specification" Version 1.0.0, 2003.

* cited by examiner (prior art)
Fig.1

METHOD OF READING DATA FROM TRANSPONDERS THROUGH A READER, A TRANSPONDER, AND A READER

FIELD OF THE INVENTION

The invention relates to a method of reading data from transponders by means of a reader device during a number of timeslots. The invention further relates to a transponder as well as to a reader device for carrying out the inventive method.

BACKGROUND OF THE INVENTION

Contactless reader devices as defined in the opening paragraph are widely used nowadays, in particular in the service sector, in the field of logistics, in the field of commerce, and in the field of industrial production. Examples generally based on smart cards are access systems to buildings and offices, payment systems, and smart cards for identifying individuals (e.g. passports). Examples based rather on the so-called RFID tags are systems for identification/pricing of objects and products, or item management in general (this technique is often referred to as electronic bar code, EPC for short), animal tagging, and paper with RFID tags inside. One will appreciate, of course, that the above examples merely represent a small segment of the numerous applications and serve to illustrate what smart cards and RFID tags may be used for. In addition, the upcoming technology of Near Field Communication, NFC for short, also belongs to the same technical field. In the following, RFID tags and smart cards as well as NFC devices, which operate in a passive mode, are generally referred to as transponders.

Reader devices are needed for all these systems (except for NFC, as the devices may also act as readers), which are to communicate with transponders within the radio range. Therefore, a reader device sends out radio signals, which may comprise commands or data and which can be received by a transponder. In addition, data and commands can be sent back to the reader by the transponder, where a distinction is to be made between passive and active transponders. A passive transponder uses the energy of the electromagnetic field to power itself, whereas an active transponder has its own power source, e.g. a battery. Furthermore, different kinds of coupling between a reader device and a transponder have to be distinguished. There is inductive coupling, electromagnetic backscatter coupling, close coupling, and electrical coupling. Finally, the various systems operate in different frequency ranges, starting from a few kHz up to several GHz. For the sake of brevity, reference is only made to general system characteristics below. However, one will easily perceive that the object of the invention and the measures taken to achieve this object are applicable to all kinds of identification systems.

One problem to be overcome in designing a reader/transponder system (e.g. an RFID system) is the question of how to handle a multitude of transponders within the radio range at the same time, i.e. how to collect data from the transponders such that data from one transponder is not superposed by data from another transponder, which is commonly denoted "data collision"? These collisions are a result of the fact that in the beginning of a so-called "inventory", in which data from all transponders, normally the ID-numbers of transponders, are collected by a reader device, neither the reader device nor the transponders have information on how many transponders are within the radio range of the reader device. This number is revealed step by step during an iterative reading procedure, which will be explained below with reference to FIGS. 1, 2a, and 2b. A similar example can be found in "Specification for RFID Air Interface—EPC Global", Version 1.0.9, 2004, EPC Global Inc., in particular section 6.3.2 and Annex B, C and F. A further similar example can be found in "Technical Report—13.56 MHZ ISM Band Class 1 RFID Interface Specification", version 1.0.0, 2003, Audio-ID Center, in particular section B. Finally, ISO/IEC 18000-6 Type A represents yet another method based on time slots, whose multiple seizure by transponders leads to a data collision.

Figure 1:
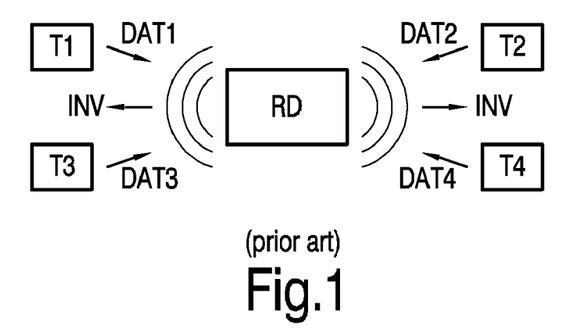
FIG. 1 shows a reader device in communication with four transponders.

FIG. 1 now shows an arrangement of a reader device RD with four transponders T1 . . . T4 within the radio range. To read data DAT1 . . . DAT4 from the transponders T1 . . . T4, the reader device RD sends out a read command INV, which is received and subsequently processed by the transponders T1 . . . T4. As a result, the requested data DAT1 . . . DAT4 are transmitted from the transponders T1 . . . T4 to the reader device RD.

Figure 2A:
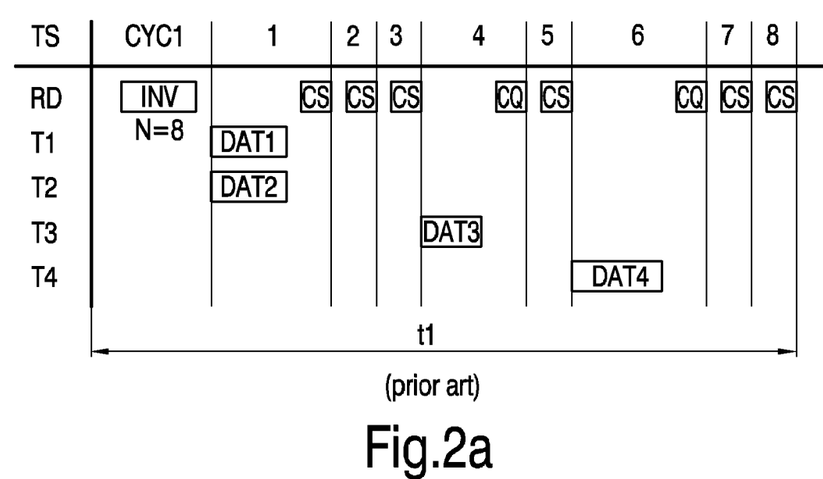
FIGS. 2a and 2b show a prior art timing diagram of a read sequence of the system shown in FIG. 1.

FIG. 2a shows a prior art timing diagram of a read sequence CYC1 of the arrangement shown in FIG. 1, which read sequence CYC1 consists of eight separate time slots TS1 . . . TS8. Said time slots TS are shown in the first row of the timing diagram. The second row shows data or commands transmitted from the read device RD to the transponders T1 . . . T4. The third to sixth rows show data that are sent back from the transponders T1 . . . T4 to the read device RD. The function of the arrangement of FIG. 1 is now as follows:

First of all a read command INV (also termed "inventory", "query", "begin round", or "init round") is issued by the reader device RD. This read command INV also comprises an item of information on how many time slots TS are to be used by the transponders T1 . . . T4 in sending back data. Hence, the number N of time slots TS is included in the read command INV, in the present example the number N=8. This number N can be determined by the reader device RD strictly randomly, based on an initial setting, or based on earlier experience, i.e. the reader device RD determines the number N from an adaptive algorithm.

Said read command INV with the number N is now received by the transponders T1 . . . T4. Based on this number N, the transponders T1 . . . T4 determine at which point in time, i.e. in which time slot TS they will answer. Commonly, this is done by randomly selecting one from all time slots TS, here by selecting one of the eight time slots TS1 . . . TS8. In the present example, the first transponder T1 chooses the first time slot TS1 to send back data DAT1 to the reader device RD. The second transponder T2 also chooses the first time slot TS1. The third transponder T3 chooses the fourth time slot T4 and the fourth transponder T4 finally the sixth time slot TS6. Now the data transmission may start.

The first timeslot TS1 starts shortly after receiving the read command INV, and hence the first and the second transponder T1 and T2 start transmitting their data DAT1 and DAT2. Unfortunately a reader device RD is usually not able to distinguish between the data streams, and therefore the data DAT1 and DAT2 are not received correctly. This state is usually called a "data collision", meaning that more than one transponder T1 . . . T4 sends its data DAT1 . . . DAT4 back to a reader device RD at the same time. However, if frequency multiplexing or code multiplexing is used, data can be received simultaneously by more than one transponder T1 . . . T4, as will be explained further below.

The reader device RD detects this data collision and sends a so-called "close slot" command CS to the transponders T1 . . . T4, which means that the next, here the second timeslot TS2, may start. It should be noted that the "close slot" command CS may appear in different techniques or standards under different names but with the same function, i.e. to inform the transponders T1 . . . T4 within the radio range of the reader device RD that the next time slot TS starts.

In the second and in the third time slot TS2 and TS3, no transponder T1 . . . T4 responds. Hence, the reader device RD switches to the next time slot by means of a close slot command CS after a comparatively short time, thus accelerating the read sequence CYC1. Therefore, the reader device RD waits during a waiting time for a transponder T1 . . . T4 to start transmitting data DAT1 . . . DAT4. After this waiting time the reader device RD proceeds with issuing the close slot command CS in the case in which no data DAT1 . . . DAT4 are received.

In the fourth time slot TS4, the third transponder T3 sends back its data DAT3. Here there is no further transponder T1, T2, T4 transmitting its data DAT1, DAT2, DAT4 back to the reader device RD so that here, contrary to the first time slot T1, no data collision occurs. The third data DAT3 is therefore correctly transmitted to the reader device RD. Therefore, the reader device RD responds with a so-called "close slot and quiet" command CQ (also termed "fix slot" or "next slot"), which marks a switch to the next time slot as explained above and in addition sets the addressed transponder, here the third transponder T3, in a quiet state. This quiet state means that the transponder stays quiet if it receives another read command INV until it is powered down. Again it has to be noted that equal commands and procedures may have different names or even slightly different causes in different standards or different techniques. Those skilled in the art may easily apply the invention also to those standards and techniques.

After the fourth time slot TS4, a further, empty time slot follows, namely the fifth time slot TS5. After that the fourth transponder T4 transmits its data DAT4 back to the reader device RD within the sixth time slot TS6. This sixth time slot TS6 is closed by a close slot and quiet command CQ as explained above. Finally, there are two more empty time slots, namely the seventh and the eighth ones TS7 and TS8, after the first read sequence CYC1 has been completed.

Figure 2B:
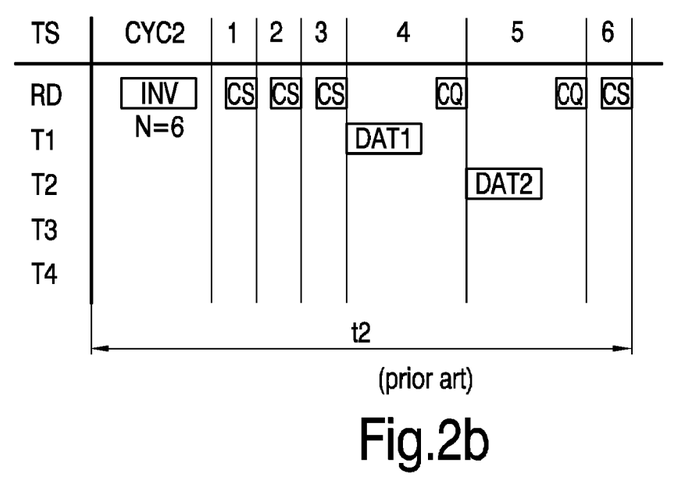

Since the read device RD has detected a data collision in the first read sequence CYC1, it is clear that data DAT1 . . . DAT4 were not received from all transponders T1 . . . T4. Hence, the reader device RD starts a second read sequence CYC2 by issuing another read command INV as shown in FIG. 2b. Since a plurality of empty time slots TS were detected in the first read sequence CYC1, the reader device RD now decides to reserve only six time slots TS. Hence, the number N comprised in the read command INV is set to N=6 (note that in common systems the number N is normally limited to powers of 2, that is to say $2^x$ for natural numbers x. Although another number N was chosen for the present example, this does not mean that the invention does not apply also to systems with such a limited possibility of choice). The procedure is equal to the one explained above for the timing diagram in FIG. 2a. Here three time slots TS1 . . . TS3 are empty before data DAT1 from the first transponder T1 and subsequently data DAT2 from the second transponder T2 are transmitted to the reader device RD in the fourth and fifth time slots TS4 and TS5. The sixth time slot TS6, finally, is empty again.

No data collision was detected in the second read sequence CYC2, so that it is clear that data DAT1 . . . DAT4 have been received from all transponders T1 . . . T4. One can easily recognize that much time is wasted by empty timeslots TS and multiple transmissions of a read command INV. This results in a correspondingly long running time of the read procedure, which is simply the sum of the time of the first read sequence t1 and the time of the second read sequence t2. Hence, it is an object of the invention to shorten the reading procedure.

OBJECT AND SUMMARY OF THE INVENTION

The object of the invention is achieved by a method of reading data from transponders by means of a reader device during a number of time slots, comprising the steps of:
observing the seizure of said timeslots in both the reader device and the transponders, and
performing a reorganization in dependence on said seizure, wherein a new number of time slots is chosen in both the reader device and the transponders, and in the transponders additionally one of the new time slots is selected in which to send data back to the reader device.

The object of the invention is furthermore achieved by a transponder designed to send data to a reader device during a number of time slots, comprising:
means for observing a seizure of said time slots by other transponders and
means for performing a reorganization in dependence on said seizure, wherein a new number of time slots is chosen and in addition one of the new time slots is selected in which to send data back to the reader device.

Finally, the object of the invention is achieved by a reader device designed to read data from transponders during a number of time slots, comprising:
means for observing the seizure of said time slots,
means for performing a reorganization in dependence on said seizure, wherein a new number of time slots is chosen without exchanging any information related to the new choices with said transponders.

According to the invention, a reorganization is performed in both the reader device and the transponders, which offers the advantage that at least some of the steps to be taken can run independently (i.e. without exchanging related information) if they are running in the same way (i.e. both doing the same things at the same time). This demands an initial setup of the rules on when and how to perform a reorganization, which may be done, for example, during manufacture of the reader device and the transponders. The manufacturer incorporates said rules, i.e. the protocol, in the design of the reader devices and the transponders. The benefit of such an initial setup is that information on said reorganization need not or only rarely be exchanged between the reader device and the transponders. The processing time of an inventory is dramatically reduced thereby.

It is advantageous if only those transponders perform said reorganization which did not transmit data to the reader device before said reorganization. This measure ensures that transponders which transmitted their data to the reader before a reorganization was initiated do not participate in said reorganization. Hence, a multiple transmission of data is beneficially avoided.

It is very advantageous if only those transponders perform said reorganization whose data were not correctly received in the reader device before said reorganization. This measure ensures that transponders whose data were correctly received at the reader (these transponders receive a close slot and quiet command) before a reorganization was initiated do not participate in said reorganization. It may happen in the embodiment mentioned above that transponders do indeed transmit their data, but these data are not correctly received at the reader, for example because of a data collision (these transponders receive a close slot command). As they have to repeat their data anyway, it is of advantage if they participate in the reorganization. Consequently, a multiple transmission of data is beneficially avoided, but only of those data that were correctly transmitted to the reader device.

It is advantageous when the inventive method comprises the initial steps of:
- choosing a number of time slots in the reader device,
- sending a read command from the reader device to the transponders within the radio range of the reader device, which read command comprises said number of time slots,
- in the transponders, choosing one of the time slots in which to send data back to the reader device.

In addition to the benefits mentioned above, the reader here determines parameters of the first run, i.e. the numbers of time slots, on its own. Hence, results of reading procedures in the past may be taken into consideration when determining the number of timeslots. It is equally conceivable that the reader device always "chooses" the same number of time slots, these being fixedly laid down by an engineer during an initial setup. In addition to the protocol-related topics mentioned above, it is furthermore conceivable that the protocol as to when and how to perform a reorganization or at least part thereof is transmitted along with the read command or before the read command, thereby further increasing the flexibility of the inventive system.

It is highly advantageous if said reorganization is performed without any information on the reorganization being exchanged between said reader device and said transponders. In this case a reorganization can be performed very efficiently as regards time as no command has to be transmitted from the reader device to the transponders, as is the case in prior art systems, where a read command occupies a number of time slots. The processing time of an inventory is further reduced thereby. It should be noted that the above refers to "explicit" information for this feature, i.e. information relating to a reorganization and intentionally exchanged between reader device and transponders immediately before a reorganization, e.g. a special command or a command with a special parameter relating to the reorganization. By contrast, information used for the decision to perform or not to perform a reorganization and derived from other information (e.g. a certain seizure of time slots, a certain timing of commands not directly related to a reorganization) is not to be regarded as "explicit". This feature furthermore does not exclude the possibility that information relating to a reorganization is initially exchanged between reader device and transponders, so without a direct time relationship to a reorganization, e.g. when setting up the system or when issuing a read command.

In a favorable embodiment of the inventive method, said reorganization is performed with a greater new number of time slots if said seizure is above a predefined limit and with a smaller number of time slots if the seizure is below a predefined limit. This is a straightforward approach of adapting the number of time slots to the real conditions, thus avoiding empty or overloaded time slots.

In an advantageous method, therefore, both the reader device and the transponders count empty time slots, wherein said reorganization is performed with a smaller new number of time slots if the number of said empty time slots exceeds a predefined limit. Counting empty timeslots is a comparatively easy manner of putting the invention into practice, as an empty time slot is an indication that the system is below its real capacity. Consequently, the time reserved for collecting data is reduced in that a lower number of time slots is chosen for the subsequent procedure.

It is furthermore advantageous to increase the counter of empty time slots in a transponder upon receipt of a close slot command, which is sent by the reader device within a waiting time after a preceding command, which waiting time is used by the reader device for waiting for data from the transponders. In conventional systems, the read device always waits a certain time for data to be transmitted from a transponder. If this does not happen because no transponder has chosen the present time slot, the reader device proceeds with issuing a so-called "close slot command", which means that the reader device switches to the next time slot. According to the invention, this behavior is evaluated so as to detect empty time slots. Therefore, only minor adaptations are necessary for updating prior art systems.

It is also advantageous when both the reader device and the transponders count data collisions between two or more transponders, and said reorganization is performed with a greater new number of time slots if the number of said data collisions exceeds a predefined limit. Counting overloaded time slots is a comparatively easy manner of putting the invention into practice, as an overloaded time slot is an indication that the system is above its real capacity. Consequently, the time reserved for collecting data is extended by choosing a greater number of time slots for the subsequent procedure.

In an advantageous embodiment, the counter of data collisions in a transponder is furthermore increased upon receipt of a close slot command, which is sent by the reader device after a waiting time following a preceding command, which waiting time is used by the reader device for waiting for data from the transponders. As was mentioned above, the reader device in conventional systems always waits a certain time for data to be transmitted from a transponder. If this happens, because a transponder has chosen the present time slot, the reader device waits until the data have been transmitted and proceeds with issuing a so-called "close slot and quiet command", which means that the reader device switches to the next time slot and instructs the transponder to stay quiet for the further procedure. However, if more than one transponder has chosen the present timeslot, a data collision will occur as all transponders are sending their data at the same time. In this case the reader device issues a normal "close slot command" since data have to be collected from the transponders in question later on. According to the invention, this behavior is evaluated so as to detect overloaded time slots. As data are transmitted in principle, this takes longer than the pure waiting time in which the reader waits for data to be transmitted from the transponders. By distinguishing between fast coming close slot commands (empty time slot) and slow coming close slot commands (overloaded time slots), the transponder can easily decide which counter to increase. Therefore, only minor adaptations are necessary for updating prior art systems.

It is furthermore favorable if the time slots are distributed over more read sequences, each beginning with a read command from the reader device. There is no guarantee that all transponders can be read out within one read sequence (i.e. upon the issue of only a single read command), even with the inventive method. To keep the design of the transponders simple, on the one hand only easy algorithms will normally be implemented in the transponders. On the other hand, it lies in the nature of easy algorithms that they cannot cover every imaginable case. Hence, it is practical that the reader gets the possibility to start further read sequences by issuing further read commands so as to collect data from transponders which were involved in a data collision and to transmit new parameters, i.e. the number of time slots, independently of the algorithm running in the transponders.

It is furthermore very advantageous if the inventive method comprises the steps of:
- in the reader device: choosing a number of time slots of a read sequence and a number of read sequences,
- sending a read command from the reader device to the transponders within the radio range of the reader device, which read command comprises said number of time slots and said number of read sequences,
- in the transponders: choosing one of the time slots and one of the read sequences as to when to send data back to the reader device,
- in both the reader device and the transponders: observing the seizure of said time slots,
- performing a reorganization in dependence on said seizure, wherein in both the reader device and the transponders a new number of time slots and a new number of read sequences are chosen, and in the transponders additionally one of the new time slots and one of the read sequences are chosen at which to send data back to the reader device.

Here the time slots are distributed over more read sequences, each starting by issuing a read command. As it is determined in advance in this example that advantageously more read sequences are to be used, the number of read sequences is also transmitted with the read command. Subsequently, the transponders not only chooses a time slot in which to answer, but also a read sequence in which to answer. The number of read sequences is determined by the reader from an initial setting, either random or based on the result of an adaptive algorithm, which takes into consideration events of the past for the decisions in the future.

It is furthermore very advantageous if transmission channels are used instead of (simple) time slots. Transmission channels are formed by time slots, in which in addition data are transmitted in different frequency bands and/or with the use of different code sequences. The data transmission in time slots, which is also referred to as "time division multiple access" (TDMA), is only one possibility for collecting data from more than one entity. Equally common in use are the so-called "frequency division multiple access" (FDMA) and the so-called "code division multiple access" (CDMA). Here a couple of frequency bands or code sequences are used to collect data from multiple sources. Hence, it is also advantageous to combine the inventive TDMA procedure with FDMA and/or CDMA so as to increase the number of transmission channels within a certain period of time further. By doing so, not only the number of time slots is a parameter in decreasing or increasing the number of transmission channels, but also the number of frequency bands and/or codes. This makes a better adaptation of the system's capacity to meet the real demand possible, because of the higher degree of freedom, but it does require a more complex system.

Accordingly, it is advantageous when the inventive method comprises the steps of:
- in the reader device: choosing a number of transmission channels of a read sequence,
- sending a read command from the reader device to the transponders within the radio range of the reader device, which read command comprises said number of transmission channels,
- in the transponders: choosing one of the transmission channels over which to send data back to the reader device,
- in both the reader device and the transponders: observing the seizure of said transmission channels,
- performing a reorganization in dependence on said seizure, wherein in both the reader device and the transponders a new number of transmission channels is chosen, and in the transponders additionally one of the new transmission channels is chosen over which to send data back to the reader device without exchanging information relating to the new choice between said reader device and said transponders.

Here the inventive method is extended to transmission channels, which do not only cover time slots, but also frequency bands as well as code sequences, as was mentioned above. Accordingly, the number of transmission channels is the parameter in extending or reducing the time reserved for the reading procedure. Although transmission channels are referred to in a general sense above, those skilled in the art will easily perceive that the above sequence is also applicable to more differentiated parameters. So, instead of varying the number of transmission channels, it is also conceivable to vary the number of time slots and/or the number of frequency channels and/or the number of codes. One will further appreciate that it is imaginable to control only one of the parameters and keep the others constant during a read sequence, or to apply any other combination.

Another favorable embodiment of the invention is a method, wherein during a reorganization a probability parameter additional to the number of timeslots or instead of the number of timeslots is chosen in both the reader device and the transponders, and in the transponders additionally a timeslot in which to send data back to the reader device is chosen with a certain probability in accordance with said probability parameter.

Here a transponder chooses a new time slot with a certain probability. In this case, a "probability parameter" is provided to the transponders when sending the read command (or init round command). According to the teachings presented so far, a transponder always chooses one of the time slots provided by the reader device. Hence, a transponder chooses a time slot in any case. Now, a different method will be presented whereby a transponder chooses a time slot only with a given probability, as illustrated by means of an example below.

The reader issues a read command with an additional probability parameter, for example, N=8 may be chosen for the number of time slots and $\frac{1}{8}$ for the probability. Accordingly, a transponder selects one of the eight time slots with the probability $\frac{1}{8}$. This means that every transponder will choose a time slot (not different so far from the methods presented above). Presuming there is a reorganization with N=6, not all transponders will choose a time slot because the probability is set to $\frac{1}{8}$, whereas the number of available time slots is only 6. Presuming there are 8 transponders left to be read, this means that only 6 of them will choose one of the available time slots. By contrast, all transponders will answer in a system without the probability parameter. As a consequence, a system using a probability parameter can reduce the risk of data collisions, but set against the risk that data cannot be received from a number of transponders. Usually, it is a good choice to make the probability parameter the reciprocal of the number of timeslots, e.g. $\frac{1}{8}$ for N=8, $\frac{1}{6}$ for N=6, etc. However, it also may be useful to make another choice so as to shift the system a little away from the risk of data collisions (reducing the probability) or away from the risk of missed transponders (increasing the probability). In addition, both the number of time slots and the probability parameter may be used for controlling the read procedure. Hence, a greater degree of freedom for controlling the read procedure is obtained. However, it is also possible that the number of time slots is kept constant, while exclusively the probability parameter is used for this control. It should also be noted at this point that the number N=1 may also be chosen, which is of particular advantage when the probability parameter is used.

In a favorable embodiment of the inventive method, furthermore, said reorganization is performed with a lower probability parameter if said seizure is above a predefined limit and with a higher probability if the seizure is below a predefined limit. This is a straightforward approach in controlling the seizure of time slots, thus avoiding empty or overloaded time slots.

In a further preferred embodiment of the invention, the probability parameter is also part of the rules on when and how to perform a reorganization, e.g. the probability is always the reciprocal of the number of time slots, which is very easy to put into practice. At first sight this does not seem very useful, but closer scrutiny shows that this measure is of particular advantage if more transponders than expected are to be read. Whereas the probability parameter reduces the risk of data collisions, ongoing reorganizations serve to get data from all transponders in a single run. Hence, the combination of reorganizations with the probability parameter provides a very efficient reading algorithm.

Finally, it is noted at this point that the various embodiments and related advantages explained in relation to the inventive method are equally applicable to the inventive transponder and the inventive reader device.

BRIEF DESCRIPTION OF THE DRAWINGS

The invention will be described in greater detail hereinafter, by way of non-limiting examples, with reference to the embodiments shown in the drawings.

DESCRIPTION OF EMBODIMENTS

FIG. 3a again shows a timing diagram for a read procedure of a reader device RD and four transponders T1 . . . T4. The commands are the same as in FIGS. 2a and 2b, so a detailed explanation of the consequences of each command is omitted for the sake of brevity.

Figure 3A:
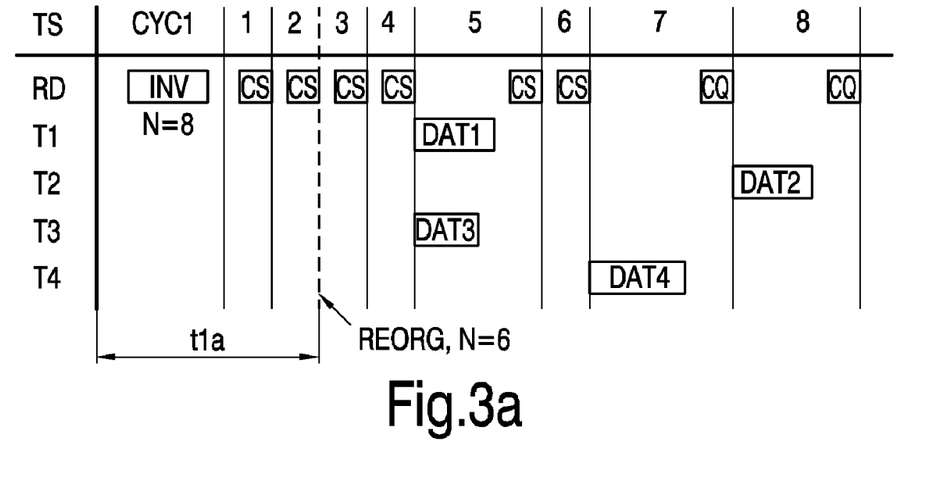
FIGS. 3a and 3b show an inventive timing diagram of a read sequence of the system shown in FIG. 1, running below its capacity.

Eight timeslots TS are again reserved for sending data DAT1 . . . DAT4 from the transponders T1 . . . T4 back to the reader device RD. Hence, the read command INV is sent out with N=8. Each transponder T1 . . . T4 again chooses one of the eight time slots T1 . . . T8, resulting in the planning as shown in FIG. 3a. Again a couple of empty time slots TS are part of the read sequence CYC1, characterized by subsequent close slot commands, each interrupted by a short waiting time. In contrast to the procedure shown in FIGS. 2a and 2b, here each transponders T1 . . . T4 observes the seizure of the time slots TS1 . . . TS4 by other transponders T1 . . . T4, i.e. for example, the first transponder T1 observes the seizure of the time slots T1 . . . T8 by the other transponders T2 . . . T4, and so on.

To do so, a transponder T1 . . . T4 counts the empty time slots TS by evaluating close slot commands CS sent out by the reader device RD shortly after a preceding command. Hence, a corresponding counter for counting empty time slots TS is increased upon receipt of a close slot command CS, which is sent by the reader device RD within a waiting time after a preceding command INV, CS, CQ, which waiting time is used by the reader device RD in waiting for data DAT1 . . . DAT4 from the transponders T1 . . . T4. To balance the seizure of the time slots TS, a reorganization REORG is performed in dependence on said seizure, wherein a new number N of timeslots TS is chosen in both the reader device RD and the transponders T1 . . . T4, and additionally in the transponders T1 . . . T4 one of the new time slots TS is selected in which to send data DAT1 . . . DAT4 back to the reader device RD.

Figure 3B:
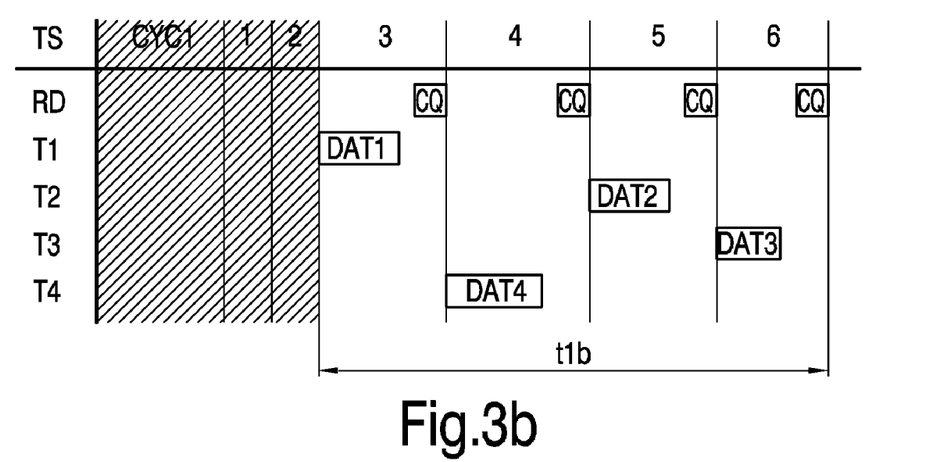

In simple words, this means that both the reader device RD and the transponders T1 . . . T4 count empty time slots TS, and when the number of empty time slots TS exceeds a certain limit (here the limit is set to 2) they choose a new number N of time slots TS at the same time. In addition, the transponders T1 . . . T4 select one of the new time slots TS so as to send data DAT1 . . . DAT4 therein back to the reader device RD. In the present example, moreover, no information is exchanged between the reader device RD and the transponders T1 . . . T4 relating to the new choices (presuming that both the reader device RD and the transponders T1 . . . T4 perform the reorganization REORG independently, i.e. without exchanging related information but in the same way, so doing the same things at the same time). The result of this reorganization REORG is shown in FIG. 3b. Here the read command INV as well as the first two time slots TS1 and TS2 are hatched as being things of the past. The reorganization is done with the number N=6, which is smaller than the initial number N=8 because a couple of empty time slots TS are an indication that the read procedure is well below its real capacity.

As a side effect, the data collision in time slot TS5 in FIG. 3a is avoided as well because the transponders T1 . . . T4 have chosen a new time slot TS1 . . . TS4 in which to send back their data DAT1 . . . DAT4. It should be noted that this happened by chance and is not a necessary consequence of the inventive method. Advantageously, all four transponders T1 . . . T4 can now be read in one run without the necessity to start a further read sequence CYC by issuing a further read command INV. However, it may still happen that a data collision occurs after a reorganization REORG so that a further read sequence CYC as shown in FIG. 2b is necessary. A note is also made on the number N=6 of the reorganization REORG. Here the number relates to the entire read procedure, so that there are four timeslots TS3 . . . TS6 left as two are in the past. However, it is also conceivable that the number N relates to the future, which would mean that N=4 is to be chosen in the present example.

The total running time of the read procedure consisting of only one read sequence CYC1 is the time before reorganization t1a plus the time after reorganization t1b. One will appreciate that the total time in this example is shorter than that in FIGS. 2a and 2b. Accordingly, the time slots TS are better used here than in the example of the prior art.

Figure 4A:
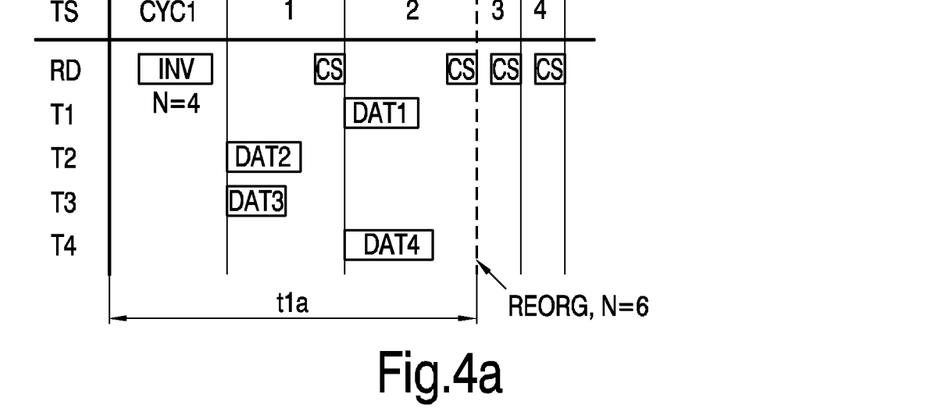
FIGS. 4a and 4b show an inventive timing diagram of a read sequence of the system shown in FIG. 1, running above its capacity.
Figure 4B:
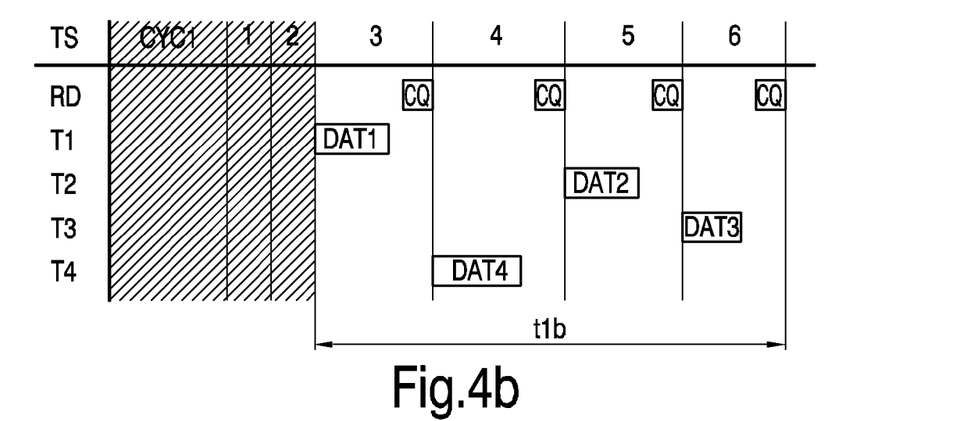

FIGS. 4a and 4b show an example in which the timeslots TS are more or less overloaded, the number N=4 of timeslots TS being low compared with the number of transponders T1 . . . T4 to be read. Strictly speaking, the number N exactly fits the number of transponders T1 . . . T4, but since the transponders T1 . . . T4 choose a time slot TS in a random manner, the risk of a data collision increases.

In the present example, the first data collision occurs in the very first time slot TS1, where the second and the third transponder T2 and T3 try to transmit their data DAT2 and DAT3. Consequently, the first time slot TS1 is closed by a close slot command CS. Moreover, there is another data collision in the second timeslot TS2, now between the first and the fourth transponder T1 and T4. Analog to the example shown in FIGS. 3a and 3b, the overloaded timeslots TS are counted here instead of the empty ones.

To do so, a transponder T1 . . . T4 counts the data collisions by evaluating close slot commands CS sent out by the reader device RD long after a preceding command. Hence, a corresponding counter for counting data collisions is increased upon receipt of a close slot command CS, which is sent by the reader device RD after a waiting time following a preceding command INV, CS, CQ, which waiting time is used by the reader device RD in waiting for data DAT1 . . . DAT4 from the transponders T1 . . . T4. To balance the seizure of the time slots TS, a reorganization REORG is again performed in dependence on said seizure, wherein a new number N of timeslots TS is chosen in both the reader device RD and the transponders T1 . . . T4, and additionally in the transponders T1 . . . T4 one of the new time slots TS is selected in which to send data DAT1 . . . DAT4 back to the reader device RD.

In simple words, this means that both the reader device RD and the transponders T1 . . . T4 count data collisions, and when the number of data collisions exceeds a certain limit (here the limit is set to 2), they choose a new number N of timeslots TS at the same time. In addition, the transponders T1 . . . T4 select one of the new time slots TS in which to send data DAT1 . . . DAT4 back to the reader device RD. In the present example, moreover, no information is exchanged between the reader device RD and the transponders T1 . . . T4 relating to the new choices. The result of this reorganization REORG is shown in FIG. 4b. Here the read command INV as well as the first two time slots TS1 and TS2 are hatched as being things of the past. The reorganization is done with the number N=6, which is higher than the initial number N=4 because a couple of data collisions are an indication that the read procedure is above its real capacity.

Advantageously, further data collisions are avoided in that the transponders T1 . . . T4 have chosen a new time slot TS1 . . . TS4 to send back their data DAT1 . . . DAT4 therein. Hence, one set of data DAT1 . . . DAT4 is transmitted from one of the transponders T1 . . . T4 to the reader device RD in each remaining timeslot TS3 . . . TS6. Advantageously, furthermore, all four transponders T1 . . . T4 can now be read in one run without the necessity to start a further read sequence CYC by issuing a further read command INV. However, it may happen that a data collision occurs even after a reorganization REORG, so that a further read sequence CYC as shown in FIG. 2b is necessary. A note is also made on the number N=6 of the reorganization REORG. Here the number relates to the entire read procedure, so that there are four timeslots TS3 . . . TS6 remaining as two are in the past. However, it is also imaginable that the number N relates to the future, which would mean that N=4 is to be chosen in the present example.

The total running time of the read procedure consisting of only one read sequence CYC1 is the time before reorganization t1a plus the time after reorganization t1b. One will appreciate that the total time in this example is shorter than that in FIGS. 2a and 2b. Accordingly, the timeslots TS are better used here than in the example of the prior art.

A threshold of two empty or overloaded time slots TS, as applicable, was chosen for the examples of FIGS. 3a to 4b. Furthermore, the number N of time slots TS was also decreased or increased by two. One will easily appreciate that this is only one example among many others, and that there are many alternative possibilities that do not depart from the scope of the invention. Thus, besides the possibility to set the threshold to any count from 1 to N, it is conceivable that the threshold is a fraction of the number N between 0 and 1. One example would be 0.4, which implies that a reorganization REORG is initiated after 3 empty/overloaded time slots TS (presuming N=8). Accordingly, it is not mandatory to decrease or increase the number N of time slots TS exclusively by two. Rather, it is possible to choose any fitting number, i.e. a lower number N in the case of many empty time slots TS and a higher number N in the case of many overloaded timeslots TS. One will also appreciate that it is conceivable to half or to double the number N upon the event of a reorganization REORG. Moreover, any scaling factor is possible, for example 0.8 (reducing the number N) or 1.2 (increasing the number N). Finally, one will also appreciate that a new number N may be calculated as follows:

$$N_{new}=N_{old}^x \text{ or } N_{new}=N_{old} \cdot e^x$$

wherein $N_{new}$ denotes the new number, $N_{old}$ denotes the old number, and x is an exponent which, depending on its value, decreases or increases $N_{new}$ with respect to $N_{old}$. The examples of FIGS. 3a to 4b furthermore apply to the embodiment of the invention where only those transponders T1 . . . T4 perform a reorganization REORG which did not transmit their data DAT1 . . . DAT4 before, or whose data DAT1 . . . DAT4 were not correctly received at the reader device RD.

Figure 5:
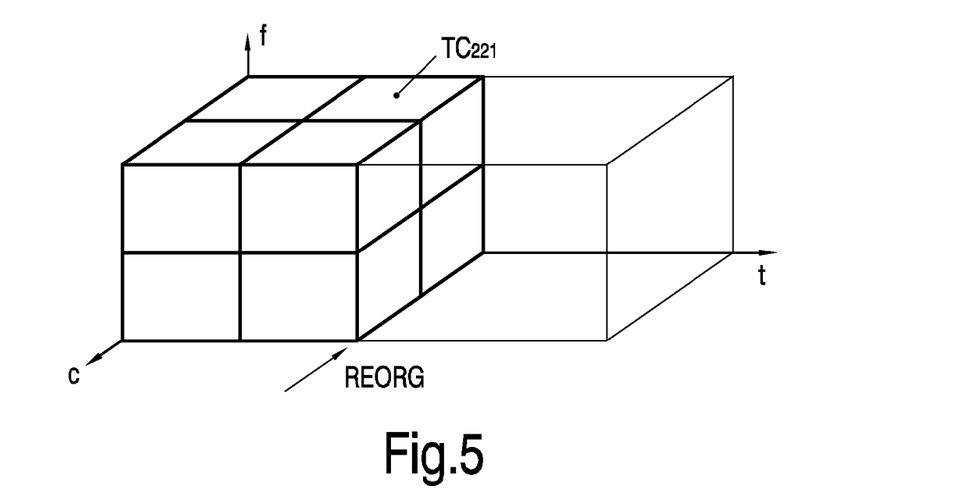
FIG. 5 shows a system combining TDMA, FDMA, and CDMA.

A further example illustrated in FIG. 5 presents a combined system. Here data DAT1 . . . DAT4 are transmitted by the transponders T1 . . . T4 not only in different time slots TS (time division multiple access—TDMA), but also by using different frequencies f and/or different codes c. The use of different frequency bands f is well known under the term "frequency division multiple access" (FDMA), the use of different codes c under the term "code division multiple access" (CDMA).

FIG. 5 shows a three-dimensional visualization of a combination of TDMA, FDMA, and CDMA. One axis represents the time t, one the frequency f, and one the code c. In the present system there are four parallel transmission channels TC at each point in time, i.e. in each timeslot TS, because two frequency bands and two different codes are used at the same time. One transmission channel is marked with a reference sign $TC_{221}$ by way of illustration. This transmission channel $TC_{221}$ has the following "coordinates": timeslot TS=2, frequency band=2, and code=1. The method is not shown in much detail in FIG. 5. However, those skilled in the art may easily derive the concept as set out above and apply it to a multidimensional system.

In a first step, the reader device RD issues a read command INV, which now not only comprises the number N of time slots TS, but also the number of frequency bands and codes. Here it is presumed that the physical characteristics of the transmission channels TC, such as length of a time slot, range of a frequency band, and code sequences, are predefined so that the parameters need not be transmitted to the transponders T1 . . . T4. However, it is also conceivable that the communication protocol or at least parts thereof are transmitted to the transponders T1 . . . T4 in an initial step.

After the first step, the transponders T1 . . . T4 start to transmit their data DAT1 . . . DAT4 in different time slots TS, in different frequency bands, and with the use of different codes. However, it may happen that even in this combined system there is a lack of transmission channels TC, so that again data collisions may occur. It is equally possible that there are many empty transmission channels TC. Consequently, in accordance with the teaching of FIGS. 2a to 4b, the number of transmission channels TC is increased in the case of overloaded transmission channels TC and decreased in the case of empty transmission channels TC. In contrast to the examples of FIGS. 2a to 4b, there is a greater degree of freedom here, i.e. not only the number N of time slots TS may be increased or decreased, but also the number of frequency bands and/or the number of codes. Again, the issuance of a new read command INV may be dispensed with if the reader device RD and the transponders T1 . . . T4 perform the reorganization REORG independently (i.e. without exchanging related information), but in the same manner (i.e. doing the same things at the same time).

A system was presented in the above example which combines TDMA, FDMA, and CDMA. However, it is also possible to use only TDMA and FDMA, or only TDMA and CDMA. In such a case FIG. 5 would not be a 3-dimensional diagram, but only a 2-dimensional one.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A method of reading data from transponders by means of a reader device during a number of time slots, the method comprising:
   observing seizure of said time slots in both the reader device and the transponders; and
   performing a reorganization in dependence on said seizure by,
   simultaneously selecting a new number of time slots in both the reader device and the transponders, and
   selecting one of the new number of time slots to send data from the transponders to the reader device.

2. The method as claimed in claim 1, wherein only those transponders perform said reorganization which did not transmit data to the reader device before said reorganization.

3. The method as claimed in claim 1, wherein only those transponders perform said reorganization whose data were not correctly received in the reader device before said reorganization.

4. The method as claimed in claim 1, wherein a transponder selects a new time slot only on the basis of a certain probability.

5. The method as claimed in claim 1, further comprising:
   counting, with both the reader device and the transponders, a number of empty time slots; and
   performing said reorganization with a smaller new number of time slots if the number of said empty time slots exceeds a predefined limit.

6. The method as claimed in claim 5, further comprising:
   increasing a count of empty time slots in a transponder upon receipt of a close slot command which is sent by the reader device within a waiting time after a preceding command.

7. The method as claimed in claim 1, further comprising:
   counting, with both the reader device and the transponders, a number of data collisions between two or more transponders; and
   performing said reorganization with a greater new number of time slots if the number of said data collisions exceeds a predefined limit.

8. The method as claimed in claim 7, further comprising:
   increasing a count of data collisions in a transponder upon receipt of a close slot command which is sent by the reader device after a waiting time following a preceding command.

9. The method as claimed in claim 1, further comprising:
   forming transmission channels with the time slots; and
   transmitting data in the formed transmission channels.

10. The method as claimed in claim 1, further comprising:
    selecting a probability parameter in both the reader device and the transponders during the reorganization; and
    selecting a time slot in which to send data back to the reader device from the transponders with a certain probability that is in accordance with said probability parameter.

11. A system comprising a reader device and at least one transponder wherein the at least one transponder sends data to the reader device during a number of time slots, the at least one transponder comprising:
    means for observing a seizure of said time slots by other transponders; and
    means for performing a reorganization in dependence on said seizure including,
    means for choosing a new number of time slots is chosen; and
    means for selecting one of the new number of time slots in which to send data back to the reader device; wherein the reader device reads the data from the at least one transponder during the number of time slots, the reader device comprising:
    means for observing the seizure of said time slots,
    means for performing the reorganization in dependence on said seizure, wherein both the reader device and the at least one transponder simultaneously select the new number of time slots.

12. The system as claimed in claim 11, further comprising:
    a counter for counting empty time slots; and
    means for increasing said counter upon receipt of a close slot command sent by the reader device within a waiting time after a preceding command.

13. The system as claimed in claim 11, further comprising:
    a counter for counting data collisions between two or more transponders; and
    means for increasing said counter upon receipt of a close slot command sent by the reader device after a waiting time following a preceding command.

14. The method of claim 1, further comprising:
    defining a three-dimensional visualization having a Time Division Multiple Access (TDMA) axis, a Frequency Division Multiple Access (FDMA) axis, and a Code Division Multiple Access (CDMA) axis.

15. The method of claim 1, further comprising:
    issuing, with the reader device, a read command comprising a number of timeslots, a number of frequency bands, and a number of codes.

16. The method of claim 1, further comprising:
    transmitting, with the transponders, data in different time slots, in different frequency bands, in different codes.

* * * * *